UNITED STATES PATENT OFFICE.

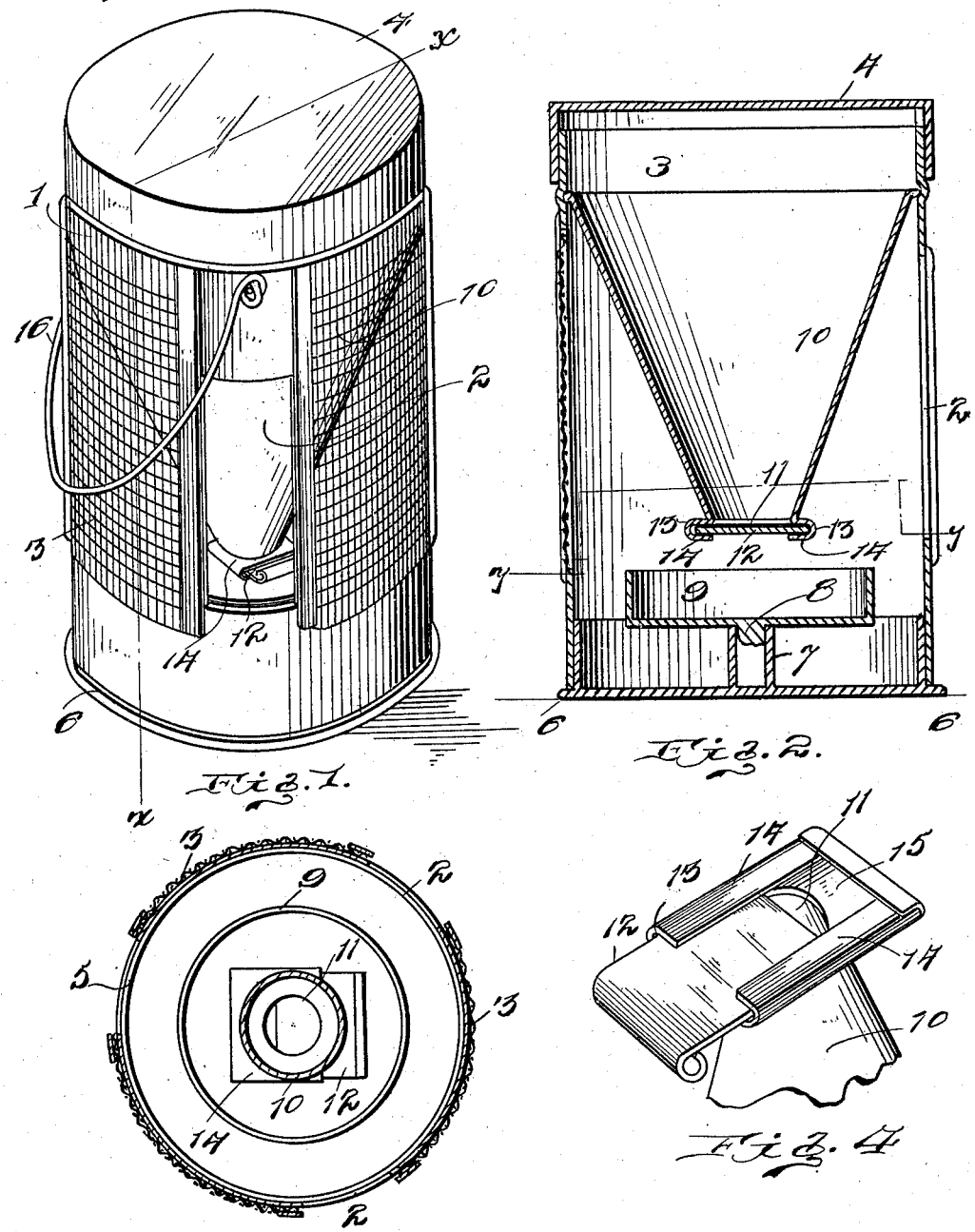

FRANK K. CROCKFORD, OF BRISTOL, RHODE ISLAND.

FEED-TROUGH.

980,496.   Specification of Letters Patent.   Patented Jan. 3, 1911.

Application filed April 19, 1910. Serial No. 556,354.

*To all whom it may concern:*

Be it known that I, FRANK K. CROCKFORD, a citizen of the United States, residing at Bristol, in the county of Bristol and State of Rhode Island, have invented certain new and useful Improvements in Feed-Troughs, of which the following is a specification, reference being had therein to the accompanying drawing.

This invention relates to portable devices for feeding live stock, especially poultry, and has for its object to provide a simple device of this character, by means of which the feed may be readily accessible and may be supplied automatically to the feeding compartment.

This invention also has for its object to provide a feeding device for live stock which may be readily taken apart and cleaned and which may be utilized both for feeding and drinking purposes.

Referring to the accompanying drawing, Figure 1 is a view in perspective of the feeding device for live stock constructed in accordance with this invention. Fig. 2 is a view in vertical section thereof on the line $x$—$x$, Fig. 1. Fig. 3 is a plan view in horizontal section on the line $y$—$y$, Fig. 2. Fig. 4 is a detailed view in perspective of the bottom of the hopper at its closure in inverted position.

The invention comprises a cylindrical chamber 1, formed of metal or other suitable material and having openings 2 in the sides which may be opened and closed by screen doors suitably mounted in the sides of said receptacle and adapted to close said openings 2. The upper end of said cylindrical main portion is formed with a shouldered end 3 adapted to receive the flanged cover 4. The bottom of said feeding device consists of a cylindrical trough 5, having a flange 6 against which the lower end of the main cylindrical portion 1 rests. The trough 5 telescopes into the main body 1 and is detachably connected therewith. The trough 5 is formed with a vertical tubular projection 7, in which is located the detachable stem 8 of a circular trough 9 having its sides or periphery spaced at a distance from the sides of the trough 5. Suspended to the main body 1 of the feeding device is a hopper 10, which is preferably mounted in the main chamber 1 by having its upper end held in frictional engagement with the inner wall of the main chamber 1 so that, when it is desired to take the feed device apart, by removing the trough 5 the hopper 10 may be withdrawn from the chamber 1 by pulling it through the open bottom of said chamber. The lower end of the hopper 10 is provided with an opening 11 which is closed by means of a slide 12 movable in grooves 13 formed by the bent portions 14 of a transverse extension 15 at the bottom of the hopper 10.

The device hereinbefore described is used as follows: Grain or other food is supplied to the hopper 10, the door 12 at the bottom thereof being closed. The trough 5 at the bottom of the receptacle is filled with water. In order that the live stock may have access to the food and water in the receptacle, screen doors 3 are slid back so that the live stock may have access to the food in the feed trough 9 and in the drinking trough 5. By partly opening the slide the feed in hopper 10 is fed by gravity to the trough 9 and the amount thereof regulated according to the position of the door 12.

The feeding device is provided with a suitable bail or handle 16 by means of which it can be carried from one place to another.

By means of the construction and arrangement of the feeding device hereinbefore described, the device will be thoroughly ventilated, kept free from dirt and grit by the openings in its sides covered by the screen doors and access may be readily had to the feeding and drinking compartments by opening said doors. Furthermore, the entire device may be readily taken apart for cleaning purposes.

Having thus described my invention, what I claim is:

1. A device of the character described, consisting of a main portion, having openings in its sides, a water trough in the bottom of said main portion, and a feed trough centrally mounted in said water trough having its sides spaced from the sides of said water trough.

2. In a device of the character described, a main receptacle having an opening in its sides, a water trough located in its bottom, a feed trough centrally located in said water trough and spaced from the sides of said trough and a feed hopper suspended above said feed trough.

3. In a device of the character described, a main receptacle, a water trough located at the bottom of said receptacle, a feed trough centrally located and having its sides spaced from the sides of said water trough, and a feed hopper suspended from the main receptacle of said feed trough and having an adjustable door closing its lower end.

4. In a device of the character described, a main receptacle having openings in its sides, a detachable water trough mounted in the bottom of said receptacle, a detachable feed trough centrally mounted in said water trough and having its sides spaced from the sides of the said trough, a feed hopper detachably mounted in said receptacle above said feed trough and a detachable cover for said main receptacle.

5. In a device of the character described, a main receptacle having openings in its sides and open ends, screen doors movable over said openings, a movable cover on the top of said receptacle, a detachable trough having telescoping connection with the bottom of said receptacle and having a central vertical projection, a feed trough detachably mounted on said central vertical projection in the water trough and having its sides spaced from the sides of said trough, and a feed hopper detachably suspended in said main receptacle above said feed trough having a sliding door at its lower end.

In testimony whereof I hereunto affix my signature in presence of two witnesses.

FRANK K. CROCKFORD.

Witnesses:
WM. W. GIFFORD,
M. W. MORGAN.